Feb. 22, 1927.  
A. W. HERRINGTON  
WHEEL MOUNT FOR MOTOR VEHICLES  
Filed Sept. 24, 1924  
1,618,431  
2 Sheets-Sheet 1

Inventor  
Arthur W. Herrington.  
By Wm. F. Doyle.  
Attorney

Feb. 22, 1927.

A. W. HERRINGTON 1,618,431

WHEEL MOUNT FOR MOTOR VEHICLES

Filed Sept. 24, 1924    2 Sheets-Sheet 2

Inventor
Arthur W. Herrington,
By
Wm. F. Doyle
Attorney

Patented Feb. 22, 1927.

1,618,431

UNITED STATES PATENT OFFICE.

ARTHUR W. HERRINGTON, OF BALTIMORE, MARYLAND.

WHEEL MOUNT FOR MOTOR VEHICLES.

Application filed September 24, 1924. Serial No. 739,662.

(GRANTED UNDER THE ACT OF MARCH 3, 1883; 22 STAT. L. 625.)

This invention relates to improvements in wheel-mounts for motor vehicles, and more particularly to a combined driven-steering wheel, provided with a housing adapted to protect the spindle, king pin bearings and driving gears and bearings, from dust, water and other foreign matter and provide a container for a lubricant for said parts, said housing being of such a construction as to provide a perfect seal about said working parts in any position of the wheel.

An object of this invention being to provide a simple, durable and inexpensive means for mounting the wheel in the end of the dead axle to provide for the distribution of the weight supporting strains in such a manner as to reduce the steering strains to the minimum, and permit free and easy swing of the spindle on the king pin in steering.

A further object being to mount the housings to effectively cover and protect the driving and mounting mechanism from dust, water and other foreign matters.

A further object being to provide a housing structure of such a character, as to retain a lubricant at a high level, thereby not only providing a more effective lubrication but increasing the operation radius of the vehicle after each charge of lubricant has been inserted into the housing, and at the same time diminishing the likelihood of the parts running dry and thereby becoming damaged.

These and other objects will appear in the following description and be finally pointed out in the claims.

Similar numerals indicate corresponding parts in all the figures of the drawings where a preferred form is shown, it being understood that slight changes in form and minor details of construction may be resorted to without departing from the spirit of the invention.

Figure 1:
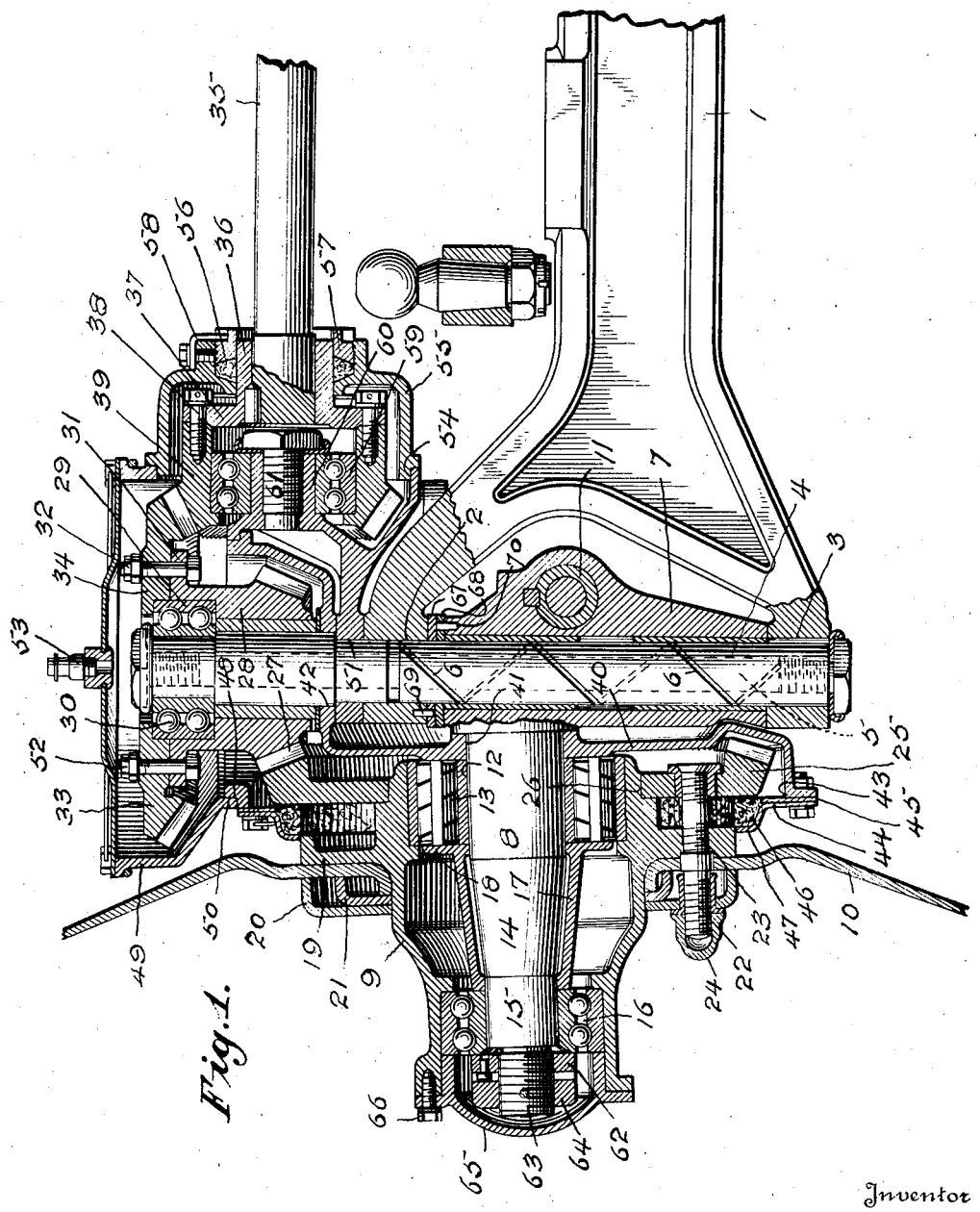
Fig. 1 is a vertical section of the improved driven steering wheel and housing, showing the parts assembled.
Figure 2:
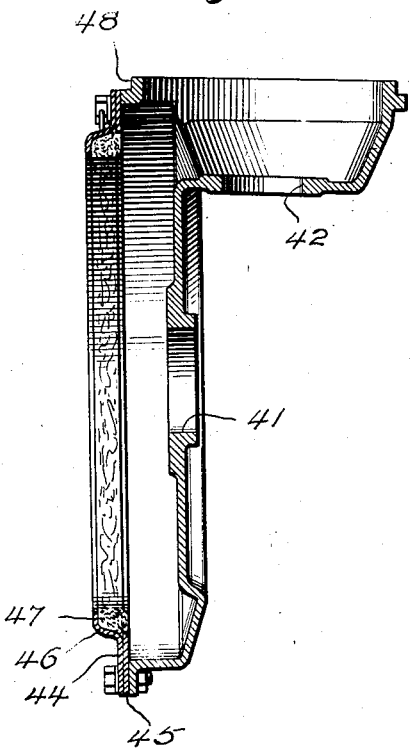
Fig. 2 is a detail sectional view of the lower housing member.
Figure 4:
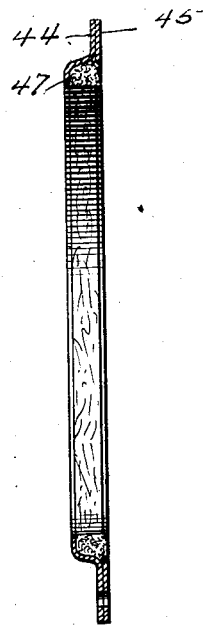
Fig. 4 is a detail view of the closure plates or diaphragm and sealing gland for the lower housing member.
Figure 3:
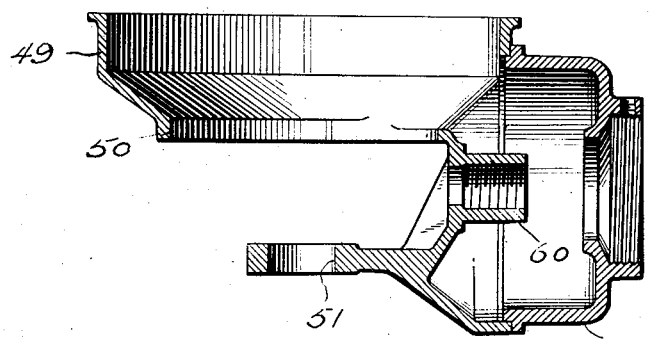
Fig. 3 is a similar view of the upper housing member.

Reference now being had to the drawings by numerals, 1 indicates the dead axle, extended at its ends into upper and lower bearings as shown at 2 and 3.

Mounted in bearings 2 and 3 is the king pin 4, which extends above the upper bearing 2 and is provided with an internal cavity 5, in communication with an external groove 6 for lubricating purposes.

Mounted on the king pin between bearings 2 and 3 is the sleeve 7 of the spindle 8, on which hub 9 of the wheel is mounted, the disc of the wheel being shown at 10.

Sleeve 7 of the spindle is provided with an enlargement in which is mounted the steering or spindle oscillating arm as shown at 11.

The spindle 8 is provided with an inner cylindrical portion 12 on which is mounted preferably a roller bearing 13, an intermediate tapered portion 14 and an outer cylindrical portion 15 on which an outer ball bearing 16 is mounted, said inner and outer bearings 13 and 16 being spaced apart by a tapered sleeve 17 provided at its inner end, with a flange 18 adapted to retain the inner bearing 13 in place and at its outer end is in contact with the outer bearing 16, to keep said bearings properly spaced.

Hub 9 is provided with a flange 19 against which the disc 10 of the wheel is mounted, outer and inner flanged washers 20 and 21 being clamped in place by retaining bolts 22. Said retaining bolts 22 may be threaded at 23 into flange 19 of the hub and be provided with nuts 24 to retain washers 20 and 21 and disc 10, in place. The inner ends of the bolts 22 extend through the web of a hub gear 25, mounted on the hub as seen at 26. Mounted on the king pin 4, above the upper dead axle bearing is lower bevel power transfer gear 27, meshing with hub gear 25, said gear 27 is provided with a sleeve or extension 28 having a seat 29 to receive a bearing 30, and with a flange 31, through which bolts 32 pass, to secure upper bevel power transfer gear 33 thereto. The web of gear 33 is preferably provided with a cut-away portion 34 on which the upper portion of bearing 30 is seated. Said bearing 30 located in such a position as to receive the heaviest strains placed on gears 27 and 33 and also to facilitate accessibility to the parts.

Keyed to the outer end of the driving axle 35 is a sleeve 36 having a flange 37, through which bolts 38 pass and are threaded, into the flange 39 of the driving bevel 33, to securely mount said gear at the end of the shaft. The mounting gear 33 will be further described later.

The dust excluding and lubricant retaining housing consists of the lower member 40 mounted at 41 on spindle 8, and at 42 on the king pin beneath gear 28. Said lower housing member is provided with an opening 43 of sufficient diameter, to admit gear 25. Covering said opening 43 when the parts are assembled, is a diaphragm, preferably composed of outer and inner sheet metal plates 44 and 45 respectively. The member 44 being shaped by bending it at its inner edge away from plate 45 as shown at 46 to provide a seat for a packing gland 47, so located as to seal the space between the outer edge of flange 19 of the hub and the outer surface of gear 25. The inner roller bearing 13 is retained in place against the inner surface of the lower housing at its point of mounting on spindle, said bearing being oiled by lubricant carried up on rotating parts that are submerged in the lubricant when in their lower position.

The lower housing is further provided with a horizontal enlargement in which bearing 42 is located, which is of sufficient size, to receive the power transmitting gear 28, and at its extreme upper edge it is provided with a bearing 48 on which the upper bearing of the upper housing member is mounted.

The upper housing 49 is provided, as is the lower housing with two bearings, neither of which is on the dead axle. The upper portion of the upper housing is of sufficient diameter to receive the power transfer bevel gear 33 which is larger than drive gear 39, and represents the first step of double reduction in speed of the driven parts. The second reduction being brought about by the relative sizes of the hub gear as compared with power transfer gear 27.

Upper housing is provided with the upper bearing 50 resting on bearing 48 of the lower housing and a lower bearing 51 mounted on the king pin between the upper dead axle bearing 2 and the bearing 42 of the lower housing. The top of the upper housing is closed by cap 52 provided with a lubricating plug 53.

The upper housing is provided with a lateral opening 54. Seated in said opening is an extension 55 which encloses and forms a housing over the drive gear 39, extends beyond said gear and flange 37 and is provided with a packing gland 56, gland nut 57 and nut locking member 58.

The packing gland 56 contacts with the outer surface of sleeve 36, and provides a lubricant seal thus forming a receptacle for lubricant of the maximum depth, since the seal between the moving and stationary parts, is made as near the center of rotation as practicable.

The manner here shown of mounting gear 39 to end of driving axle 35 provides increased accessibility, when assembling and disassembling the parts.

The gear 39 is provided with a sleeve in which, preferably a ball bearing 59 is located, the inner ball race of which is mounted on a bearing support 60 forming a part of the upper casing. Into said bearing member 56 is threaded a plug 61 having a head of sufficient diameter to overlap and retain in place the bearing 59, on bearing support 60.

The outer wheel hub bearing 16 is held on the spindle by nut 62, threaded on spindle shank 63 and locked thereon by lock nut 64, said nut 62 overlapping the inner ball race of the bearing 16. The outer ball race of the bearing being held in place by a flange on the cap 65 retained in place by cap screws 66, passing through a flange of cap 65 and tapped into hub forging 9.

Thrust bearing plates 67 and 68 between upper dead axle bearing 2 and top of spindle sleeve 7, are pinned at 69 and 70 to the bearing and sleeve respectively, and are adapted to receive the wear at that point, said plates may be replaced if worn or broken at little cost.

The operation is as follows: Power enters the knuckle through live axle 35. Mounted to rotate with said shaft is the drive gear 39, meshing with power transfer gear 33. Rigidly secured to transfer gear 33 is power transfer gear 27, meshing with hub gear 25, rigidly secured on the hub 9 of the wheel.

A steering lever not shown is mounted at 11 in the sleeve of the spindle. When said lever is operated the wheel spindle is swung on the king pin as a center.

The lower housing member is mounted on the spindle and king pin and moves with the spindle.

The upper housing is mounted on the king pin and on the bearing at the upper end of the lower housing, said bearing center being concentric with the axis of the king pin. The upper casing remains stationary in relation to the dead axle, and has no oscillating movement in steering while lower housing swings with the spindle, the swivel connection between the housing members being at 48.

Having thus described my invention, what I claim as new and desire to secure by Letters Patent is:

1. A wheel drive comprising a dead axle having upper and lower bearings at its end, a king pin mounted in said bearings extending above the upper bearing, a spindle having a sleeve mounted on the king pin between the bearings, a wheel hub rotatably mounted on the spindle, a hub gear mounted on the hub, a driving axle, a driving gear mounted at the end of the driving axle, upper and lower power transfer gears mounted on the king pin above its bearings, said upper gear meshing with and operated by said driving gear and said lower gear meshing with and operating said hub gear, and a housing having lower and upper sections in swivel relation, said lower section being mounted on said spindle and king pin and having a bearing at its upper portion, said upper section being mounted on the king pin and on said bearing at the upper portion of the lower section.

2. A wheel drive, comprising a dead axle having upper and lower bearings at its end, a king pin mounted in said bearings extending above the upper bearing, a spindle having a sleeve mounted on the king pin between the bearings, a wheel hub rotatably mounted on the spindle, a flange extending outwardly from the hub, a hub gear mounted on the hub, a wheel disc mounted on the hub in contact with the flange, common means for securing the gear and disc on the hub and to the flange respectively, a driving axle, a driving gear mounted at the end of said driving axle, upper and lower power transfer gears mounted on the king pin above its bearings, said upper gear meshing with and operated by said driving gear and said lower gear meshing with and operating said hub gear and a housing having lower and upper sections in swivel relation, said lower section being mounted on said spindle and king pin, and having a bearing at its upper portion, said upper section being mounted on the king pin and on said bearing at the upper portion of the lower section.

3. A wheel drive, comprising a dead axle having upper and lower bearings at its end, a king pin mounted in said bearings, extending above the upper bearing, a spindle having a sleeve mounted on the king pin between the bearings, a wheel hub rotatably mounted on the spindle, a flange extending from the hub, a hub gear mounted on the hub and spaced from said flange, a wheel disc mounted on the hub adjacent to the outer face of the flange, flanged washers mounted on the hub with their flanges in contact with the disc and common means for securing the hub gear, disc and flanged washers, to the flange of the hub, a driving axle, a driving gear mounted at the end of said driving axle, upper and lower power transfer gears, operating together, mounted on the king pin above its bearings, said upper gear meshing with and operated by said driving gear, said lower gear meshing with and operating said hub gear and a housing having lower and upper sections in swivel relation mounted on the spindle and king pin and on the king pin and upper portion of the lower section respectively.

4. A wheel drive, comprising a dead axle having upper and lower bearings at its end, a king pin mounted in said bearings extending above the upper bearing, a spindle having a sleeve mounted on the king pin between the bearings, a wheel hub rotatably mounted on the spindle, a flange extending from the hub, a hub gear mounted on the hub spaced from said flange, a wheel disc mounted on the hub adjacent to the outer face of the flange, flanged washers mounted on the hub with their flanges in contact with the disc and means for securing the hub gear, wheel disc and washers to the hub flange consisting of a series of bolts, screw-threaded into the flange of the hub, a flanged sleeve threaded on the inner end of the bolt and extending into the hub gear, and a flanged nut threaded on the outer end of the bolt in contact with the outer washer, a driving axle, a driving gear mounted at the end of said driving axle upper and lower transfer gears operating together, mounted on the king pin above its bearings, said upper gear meshing with and operated by said driving gear, said lower gear meshing with and operating said hub gear and a housing having lower and upper sections in swivel relation, said lower section being mounted on said spindle and king pin and inclosing said hub gear and provided with a bearing at its upper portion, said upper section being mounted on the king pin and on said bearing at the upper portion of the lower section.

5. A wheel drive, comprising a dead axle having upper and lower bearings at its end, a king pin mounted in said bearings extending above the upper bearing, a spindle having a sleeve mounted on the king pin between the bearings, a wheel hub rotatably mounted on the spindle, a driving axle, a sleeve having a flange, keyed on the end of the driving axle, a driving gear mounted on said flange, upper and lower power transfer gears mounted on the king pin above its bearings, said upper gear meshing with and operated by said driving gear, said lower gear meshing with and operating said hub gear and a housing having lower and upper sections in swivel relation, said lower section being mounted on said spindle and king pin and having a bearing at its upper portion, said upper section being mounted on the king pin and on said bearing at the upper portion of the lower section.

6. A wheel drive, comprising a dead axle having upper and lower bearings at its end, a king pin mounted in said bearings extending above the upper bearing, a spindle having a sleeve mounted on the king pin between the bearings, a wheel hub rotatably mounted on the spindle, a hub gear mounted on the hub, a driving axle, a driving gear mounted at the end of said driving axle, upper and lower power transfer gears mounted on the king pin above its bearings, and a housing having lower and upper sections in swivel relation, said lower section being mounted on the spindle and king pin and having a bearing at its upper portion and an opening for entrance of said hub gear, and a diaphragm adapted to close the opening and seal the space between the opening in the casing and the hub, said upper section being mounted on the king pin and on said bearing at the upper portion of the lower section.

7. A wheel drive, comprising a dead axle having upper and lower bearings at its end, a king pin mounted in said bearings extending above the upper bearing, a spindle having a sleeve mounted on the king pin between the bearings, a wheel hub having a flange rotatably mounted on the spindle, a hub gear mounted on the hub, a driving axle, a driving gear mounted at the end of said driving axle, upper and lower power transfer gears secured together and mounted on the king pin above its bearings and a housing having lower and upper sections in swivel relation, said lower section being mounted on the spindle and king pin, and having a bearing at its upper portion, and an opening for entrance of said hub gear, and a laminated sheet metal diaphragm having the inner edge of one of its members bent to receive a gasket adapted to close said opening and seal the space between the outer periphery of said flange and the opening in the housing, said upper section being mounted on the king pin and on said bearings of the upper portion of the lower section.

8. A wheel drive, comprising a dead axle having upper and lower bearings at its end, a king pin mounted in said bearings extending above the upper bearing, a spindle having a sleeve mounted on the king pin between the bearings, a wheel hub rotatably mounted on the spindle, a hub gear mounted on the hub, a housing having lower and upper sections in swivel relation, said lower section being mounted on said spindle and king pin and having a bearing at its upper portion, said upper section being mounted on the king pin and on said bearing at the upper portion of the lower section, and provided with a lateral opening and a bearing extension, a driving axle, a sleeve having a flange keyed to the driving axle at its end, a driving gear mounted on said flange and on the bearing extension of the upper housing section, upper and lower power transfer gears mounted on the king pin above its bearings, said upper gear meshing with and operated by said driving gear and said lower gear meshing with and operating said hub gear.

9. A wheel drive, comprising a dead axle having upper and lower bearings at its end, a king pin mounted in said bearings extending above the upper bearing, a spindle having a sleeve mounted on the king pin between the bearings, a wheel hub rotatably mounted on the spindle, a hub gear mounted on the hub, a housing having lower and upper sections in swivel relation, said lower section being mounted on said spindle and king pin and having a bearing at its upper portion, said upper section being mounted on the king pin and on said bearing at the upper portion of the lower section, and provided with a lateral opening and a bearing extension, a driving axle, a sleeve having a flange keyed to the driving axle at its end, a driving gear mounted on said flange and on the bearing extension of the upper housing section, a casing extension secured in the lateral opening of the upper section provided with a packing gland operating on said sleeve on the drive shaft, upper and lower power transfer gears mounted on the king pin above its bearings, said upper gear meshing with and operated by said driving gear and said lower gear meshing with and operating said hub gear.

10. A wheel drive, comprising a dead axle having bearings at its end, a king pin extending through and above the bearings, a driving axle, a spindle mounted upon the king pin between the bearings, a housing structure having lower and upper members in swivel relation supported upon the spindle and king pin and upon the king pin and the other member respectively, a wheel hub rotatably mounted upon the spindle, power transfer gears loosely mounted upon the upper portion of the king pin within the housing, a gear carried by the driving axle and meshing with the upper power transfer gear and a gear carried by the hub and meshing with the lower power transfer gear.

11. A wheel drive, comprising a dead axle, a king pin carried by the dead axle, a driving axle, a spindle loosely mounted upon the king pin, a housing having a lower section mounted upon the spindle and upon the king pin and an upper section mounted on the king pin beneath the lower housing, said housing sections having swivel connection, a wheel hub rotatably mounted upon the spindle and extending into the lower section of the housing, a gear carried by the wheel hub within the lower section of the housing, a gear carried by the driving axle within the upper section of the housing, upper and lower power transfer gears mounted on the upper portion of the king pin, said upper gear meshing with the gear of the driving axle and said lower gear meshing with the gear carried by the wheel hub.

ARTHUR W. HERRINGTON.